Jan. 2, 1951 W. LOTMAR 2,536,508
PHOTOGRAPHIC OBJECTIVE
Filed June 21, 1946

INVENTOR.
WALTER LOTMAR
ATTORNEY

Patented Jan. 2, 1951

2,536,508

UNITED STATES PATENT OFFICE 2,536,508

PHOTOGRAPHIC OBJECTIVE

Walter Lotmar, Aarau, Switzerland

Application June 21, 1946, Serial No. 678,232
In Switzerland June 30, 1945

4 Claims. (Cl. 88—57)

This invention relates to objectives for photographic apparatus, particularly to objectives composed of several lens components separated by air spaces.

One object of the invention is a photographic objective which is corrected spherically, astigmatically and comatically for one or more colors.

Another object of the invention is a photographic objective of the general type, above referred to, in which the spherical errors and aberrations of the focal distances, and other errors of the objective are corrected to a high degree.

Another object of the invention is a photographic objective which possesses a practically apochromatic color correction.

Another object of the invention is a photographic objective which has a comparatively large intersection length in relation to the focal length thereof, which property is particularly advantageous in connection with use in motion picture cameras.

Other and further objects, features and advantages of the invention will be hereinafter set forth and the novel features thereof defined by the appended claims.

In the accompanying drawings several embodiments of the invention are shown by way of illustration and not by way of limitation.

Figure 1:
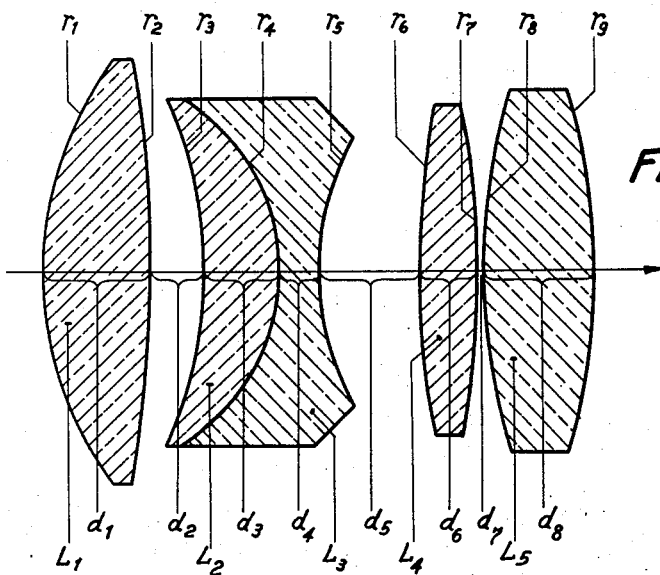
Fig. 1 is a sectional view of a photographic objective according to the invention.

Referring now to the figures more in detail, Fig. 1 shows a photographic objective composed of a collecting lens $L_1$, dispersing component comprising cemented lenses $L_2$ and $L_3$, a collecting lens $L_4$ and a collecting lens $L_5$. Lenses $L_1$; $L_2$, $L_3$; $L_4$; and $L_5$ are separated by air spaces. The direction of incident light entering the long conjugate end of the system is indicated by an arrow. Lens $L_2$ of the second component of the objective (seen in the direction of incident light) is a collecting lens and lens $L_3$ is a dispersing lens, lens $L_2$ having a higher index of refraction and a higher $v$ than lens $L_3$ cemented thereto.

It has been found advantageous to select for collecting lens $L_2$ a glass having an index of refraction $n_d$ of at least 1.72 and to choose for the second dispersing lens $L_3$ a glass having an index of refraction which is at least 0.07 smaller than the index of refraction of lens $L_2$ and having a value $v$ at least 4.0 smaller.

As can be clearly seen on Fig. 1, the concave surface of the cemented surface included in the dispersing component of the objective is directed toward the incoming light. As a result, it has been found possible to design an objective according to the invention practically free of zones for a relative aperture of more than f/1.4 and a field angle of more than 30 degrees.

In the following table, the essential data are given for a focal length F—100, the first column showing radii of curvature in accordance with usual sign convention, the second column showing axial thicknesses and air spacings, the third and the last column being the $n_d$ and $v$ (Abbe number) values of the corresponding elements.

Table

| radii | spacings | $n_d$ | $v$ |
|---|---|---|---|
| $r_1 = +\ 69.14$ | $d_1 = 21.35$ | 1.6073 | 49.2 |
| $r_2 = -300.75$ | $d_2 = 10.66$ | air | |
| $r_3 = -\ 83.76$ | $d_3 = 15.01$ | 1.7234 | 38.0 |
| $r_4 = -\ 40.30$ | $d_4 = 7.90$ | 1.6483 | 33.8 |
| $r_5 = +\ 53.73$ | $d_5 = 20.15$ | air | |
| $r_6 = +167.28$ | $d_6 = 11.84$ | 1.6204 | 60.3 |
| $r_7 = -167.28$ | $d_7 = 0.79$ | air | |
| $r_8 = +120.11$ | $d_8 = 22.13$ | 1.6204 | 60.3 |
| $r_9 = -122.48$ | | | |

F—100.0; Intersection length 69.0; f/1.4.

Figure 2:
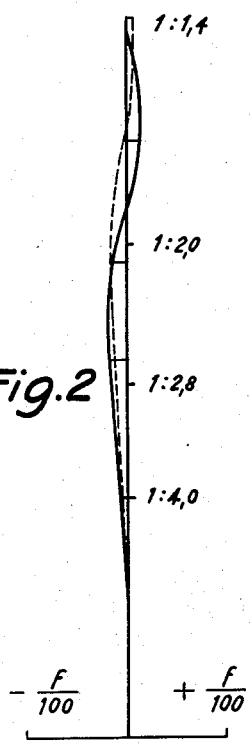
Fig. 2 is a chart showing the spherical aberrations of an objective according to the invention.

In the chart according to Fig. 2, the full line curve shows the spherical aberration calculated according to the table above given. The dashed line curve shows the aberration of the focal length for the $d$ line in the conventional manner. The horizontal distance between the two curves at any height is a measure of the coma present. Thus, the greatest spherical aberration of a zone is only 0.18% of the focal length when the marginal light beam for f/1.4 is corrected to zero. It should be noted also that the amount of coma present is negligible, a very desirable condition not readily attainable with extremely high relative apertures.

Figure 3:
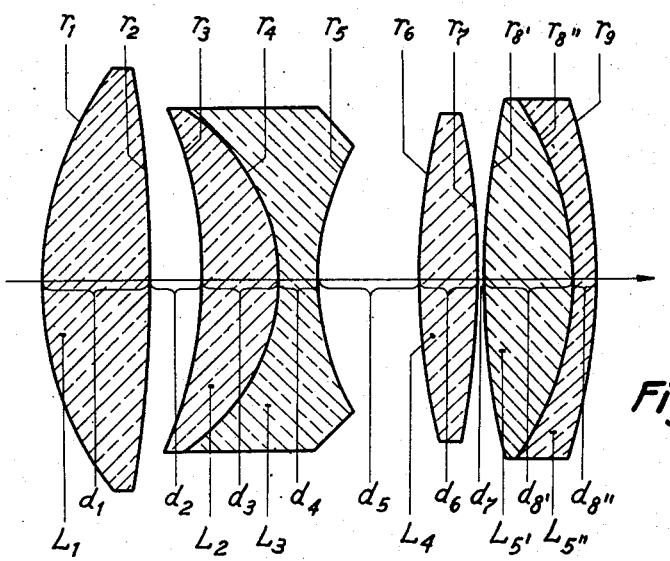
Fig. 3 is a sectional view of a modification of an objective according to the invention.

The modification according to Fig. 3 shows a photographic objective in which is introduced a second cemented surface. It has been found advantageous to include such second cemented surface in the last collecting component of the objective. According to Fig. 3, the last lens component is composed of a collecting lens $L_5'$ and a dispersing component $L_5''$. These two components are joined by a cemented surface which causes very little, if any refraction. The second cemented surface results in a practically complete apochromatic correction of the objective when the indices of the two lenses joined by the cemented surface have values that differ by less than 0.01 and when the $v$ number of collecting lens $L_5'$ is greater than the $v$ number of dispersing lens $L_5''$.

The following table shows the essential data of an objective according to Fig. 3.

| radii | spacings | $n_D$ | $v$ |
|---|---|---|---|
| $r_1 = +69.14$ | | | |
| | $d_1 = 21.35$ | 1.6073 | 49.2 |
| $r_2 = -300.75$ | | | |
| | $d_2 = 10.66$ | air | |
| $r_3 = -83.76$ | | | |
| | $d_3 = 15.01$ | 1.7234 | 38.0 |
| $r_4 = -40.30$ | | | |
| | $d_4 = 7.90$ | 1.6483 | 33.8 |
| $r_5 = +53.73$ | | | |
| | $d_5 = 20.15$ | air | |
| $r_6 = +167.28$ | | | |
| | $d_6 = 11.84$ | 1.6204 | 60.3 |
| $r_7 = -167.28$ | | | |
| | $d_7 = 0.79$ | air | |
| $r_8' = +120.11$ | | | |
| | $d_8' = 17.50$ | 1.6204 | 60.3 |
| $r_8'' = -63.20$ | | | |
| | $d_8'' = 4.63$ | 1.6202 | 36.3 |
| $r_9 = -122.48$ | | | |

$F-100.0$ Intersection length 69.0 f/1.4.

While the invention has been described in detail with respect to certain particular preferred examples and embodiments it will be understood by those skilled in the art after understanding the invention that various changes and modifications may be made without departing from the spirit and scope of the invention, and it is intended therefore, in the appended claims to cover all such changes and modifications.

What is claimed as new and desired to be secured by Letters Patent is:

1. A photographic objective comprising, as seen in the direction of incident light, a first collecting component, a second dispersing component, a third collecting component, and a fourth collecting component, said components being separated by air spaces therebetween, the dispersing component consisting of an anterior collecting element and a posterior dispersing element cemented thereto, said anterior collecting element having the optical constants:

Glass: $n_d = 1.7234$; $v = 38.0$
Radii: $r_3 = -83.76$ mm.; $r_4 = -40.30$ mm.
Thickness: $d_3 = 15.01$ mm.;

and said posterior dispersing element having the optical constants:

Glass: $n_d = 1.6483$; $v = 33.8$
Radii: $r_4 = -40.30$ mm.; $r_5 = +53.73$ mm.
Thickness: $d_4 = 7.90$ mm.;

said objective having a focal length of $f = 100.0$ and wherein ($r_3$) is the radius of the first air surface of the anterior collecting element, ($r_4$) is the radius of the cemented surface between the anterior collecting element and the posterior dispersing element and ($r_5$) is the radius of the last and air surface of the posterior dispersing element of the second or dispersing component.

2. A photographic objective comprising, as seen in the direction of incident light, a first collecting component, a second dispersing component, a third collecting component, and a fourth collecting component, said componetns being separated by air spaces therebetween, the dispersing component consisting of an anterior collecting element and posterior dispersing element cemented thereto, said anterior collecting element having the optical constants:

Glass: $n_d = 1.7234$; $v = 38.0$
Radii: $r_3 = -83.76$ mm.; $r_4 = -40.30$ mm.
Thickness: $d_3 = 15.01$ mm.;

and said posterior dispersing element having the optical constants:

Glass: $n_d = 1.6483$; $v = 33.8$
Radii: $r_4 = -40.30$ mm.; $r_5 = +53.73$ mm.
Thickness: $d_4 = 7.90$ mm.;

the air spacing between the first component and the second component being:

$d_2 = 10.66$ mm.;

the air spacing between the third component and the second component being:

$d_5 = 20.15$ mm.;

said objective having a focal length of $f = 100.0$ and wherein ($r_3$) is the radius of the first air surface of the anterior collecting element, ($r_4$) is the radius of the cemented surface between the anterior collecting element and the posterior dispersing element and ($r_5$) is the radius of the last and air surface of the posterior dispersing element of the second or dispersing component.

3. A photographic objective as described in claim 2, wherein the concave surface of the cemented surface joining said two elements is directed toward the incident light.

4. Photographic objective comprising, as seen in the direction of incident light, a first collecting component, a second dispersing component, a third collecting component, and a fourth collecting component, said components separated by air spaces therein between, the dispersing component being composed of an anterior collecting element and a posterior dispersing element cemented thereto, the anterior element having a greater index of refraction than the posterior element, said fourth collecting component being composed of an anterior collecting element and a posterior dispersing element cemented thereto, said anterior collecting element of the fourth component having the optical constants:

Glass: $n_d = 1.6204$; $v = 60.3$;
Radii: $r_8' = +120.11$ mm.; $r_8'' = -63.20$ mm.;
Thickness: $d_8' = 17.50$ mm.;

said posterior dispersing element of the fourth component having the optical constants:

Glass: $n_d = 1.6204$; $v = 60.3$
Radii: $r_8'' = -63.20$ mm.; $r_9 = 122.48$ mm.
Thickness: $d_8'' = 4.63$ mm.;

the air space between the fourth component and the third component being:

$d_7 = 0.79$ mm.;

said objective having a focal length of $f = 100.0$ and wherein ($r_3$) is the radius of the first air surface of the anterior collecting element, ($r_4$) is the radius of the cemented surface between the anterior collecting element and the posterior dispersing element, ($r_5$) is the radius of the last and air surface of the posterior dispersing element of the second or dispersing component, ($r_8'$) is the radius of the first air surface of the anterior collecting element of the fourth collecting component, ($r_8''$) is the radius of the cemented surface between the anterior element and the posterior element of the fourth collecting component, and ($r_9$) is the last and air surface of the posterior element of the fourth collecting component; and wherein ($d_8'$) is the maximal thickness of the anterior element of the fourth collecting component, ($d_8''$) is the maximal thickness of the posterior element of the fourth collecting component.

WALTER LOTMAR.

REFERENCES CITED

The following references are of record in the file of this patent:

UNITED STATES PATENTS

| Number | Name | Date |
|---|---|---|
| 1,580,751 | Merte | Apr. 13, 1926 |
| 1,877,355 | Minor | Sept. 13, 1932 |
| 1,899,934 | Berek | Mar. 7, 1933 |
| 1,939,098 | Berek | Dec. 12, 1933 |
| 1,945,570 | Rudolph | Feb. 6, 1934 |
| 2,336,300 | Schade | Dec. 7, 1943 |

FOREIGN PATENTS

| Number | Country | Date |
|---|---|---|
| 435,763 | Germany | Oct. 19, 1926 |